US012594793B2

(12) United States Patent
Reynal De St-Michel et al.

(10) Patent No.: US 12,594,793 B2
(45) Date of Patent: Apr. 7, 2026

(54) TIRE COMPRISING A PAIR OF FLEXIBLE BEAD CORES

(71) Applicant: COMPAGNIE GENERALE DES ETABLISSEMENTS MICHELIN, Clermont-Ferrand (FR)

(72) Inventors: Remi Reynal De St-Michel, Clermont-Ferrand (FR); Michel Ahouanto, Clermont-Ferrand (FR); Sylvain Morival, Clermont-Ferrand (FR); Olivier Reix, Clermont-Ferrand (FR); Jean-Mathieu Clergeat, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 4 days.

(21) Appl. No.: 18/711,349

(22) PCT Filed: Nov. 14, 2022

(86) PCT No.: PCT/EP2022/081834
§ 371 (c)(1),
(2) Date: May 17, 2024

(87) PCT Pub. No.: WO2023/088848
PCT Pub. Date: May 25, 2023

(65) Prior Publication Data
US 2025/0001813 A1     Jan. 2, 2025

(30) Foreign Application Priority Data
Nov. 19, 2021     (FR) ...................................... 2112236

(51) Int. Cl.
*B60C 15/04*          (2006.01)

(52) U.S. Cl.
CPC ........ *B60C 15/04* (2013.01); *B60C 2015/042* (2013.01); *B60C 2015/046* (2013.01)

(58) Field of Classification Search
CPC ................ B60C 15/04; B60C 15/0628; B60C 2015/042; B60C 2015/046
See application file for complete search history.

(56) References Cited

U.S. PATENT DOCUMENTS 3,419,060 A     12/1968  Goy
3,977,172 A      8/1976  Kerawalla
(Continued)

FOREIGN PATENT DOCUMENTS

DE        19706262 A1     8/1997
EP         0021485 A1     1/1981
(Continued)

OTHER PUBLICATIONS

International Search Report dated Jan. 9, 2023, in corresponding PCT/EP2022/081834 (5 pages).

*Primary Examiner* — Katelyn W Smith
*Assistant Examiner* — Thomas Frank Schneider
(74) *Attorney, Agent, or Firm* — VENABLE LLP

(57)          ABSTRACT

A tire comprises a pair of flexible bead wires (51) of reduced mass. Each bead wire (51) has the form of a closed circumferential ring, bracing the bead of the tire (1) against the rim (100) and comprising a first part made of a first material M1 taking the form of textile cords (560), the first part interacting with a second part of the bead wire (51) made of a reinforcing second material M2; the tensile stiffness is comprised between $4.5 \times 10^5$ N/m and $1.8 \times 10^6$ N/m; the circumferential bending stiffness, Kf, is greater than or equal to $Kr \times (1000 \times D/(16 \times 25.4))^3$, where D is the diameter of the wheel on which the tire is mounted, measured at the seat (110) of the rim (100) in meters, and where Kr is equal to
(Continued)

$2.10^{-2}$ N·m$^2$; and the elastic elongation is greater than or equal to 2%.

16 Claims, 2 Drawing Sheets

(56) References Cited

U.S. PATENT DOCUMENTS

| | | | |
|---|---|---|---|
| 4,155,394 A | 5/1979 | Shepherd et al. | |
| 4,368,615 A | 1/1983 | Lammers | |
| 4,793,131 A | 12/1988 | Mizuno et al. | |
| 4,926,920 A | 5/1990 | Gouttebessis et al. | |
| 5,558,144 A | 9/1996 | Nakayasu et al. | |
| 7,222,481 B2 * | 5/2007 | Esnault .................. | B60C 9/005 |
| | | | 57/210 |
| 2015/0174968 A1 | 6/2015 | Huyghe et al. | |

FOREIGN PATENT DOCUMENTS

| | | | | |
|---|---|---|---|---|
| EP | 0220642 A1 | 5/1987 | | |
| EP | 0225391 A1 | 6/1987 | | |
| EP | 0335588 A2 | 10/1989 | | |
| EP | 0467585 A1 | 1/1992 | | |
| EP | 3287302 A1 * | 2/2018 | ............ | B60C 15/04 |
| FR | 2741566 A3 | 5/1997 | | |
| JP | 4-78703 A | 3/1992 | | |
| JP | 4-266506 A | 9/1992 | | |
| JP | 5-24418 A | 2/1993 | | |
| JP | 2001-301430 A | 10/2001 | | |
| JP | 2010-173437 A | 8/2010 | | |
| KR | 20000029389 A * | 5/2000 | ............ | B29D 30/48 |
| WO | 2013/182597 A1 | 12/2013 | | |

* cited by examiner

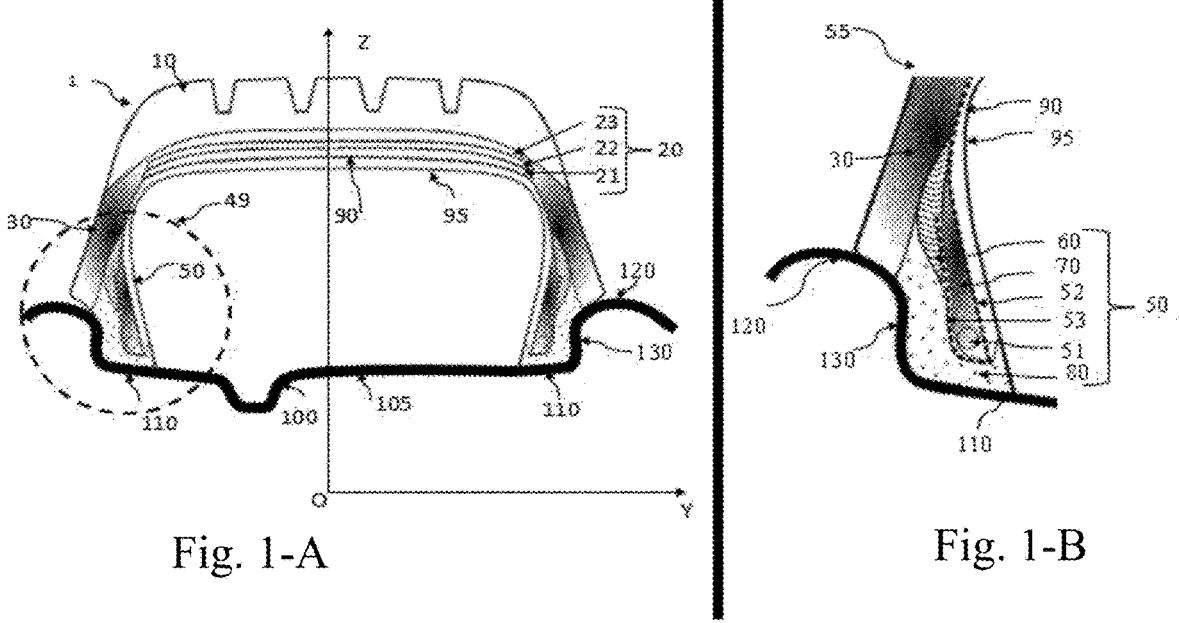
Fig. 1-A                    Fig. 1-B
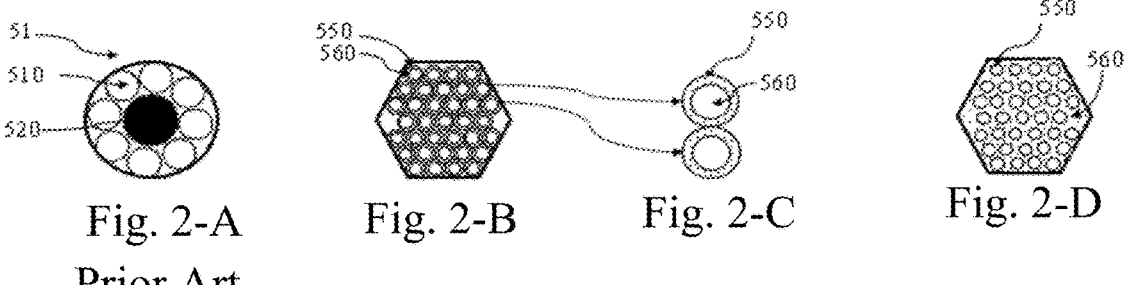
Fig. 2-A          Fig. 2-B      Fig. 2-C          Fig. 2-D
Prior Art

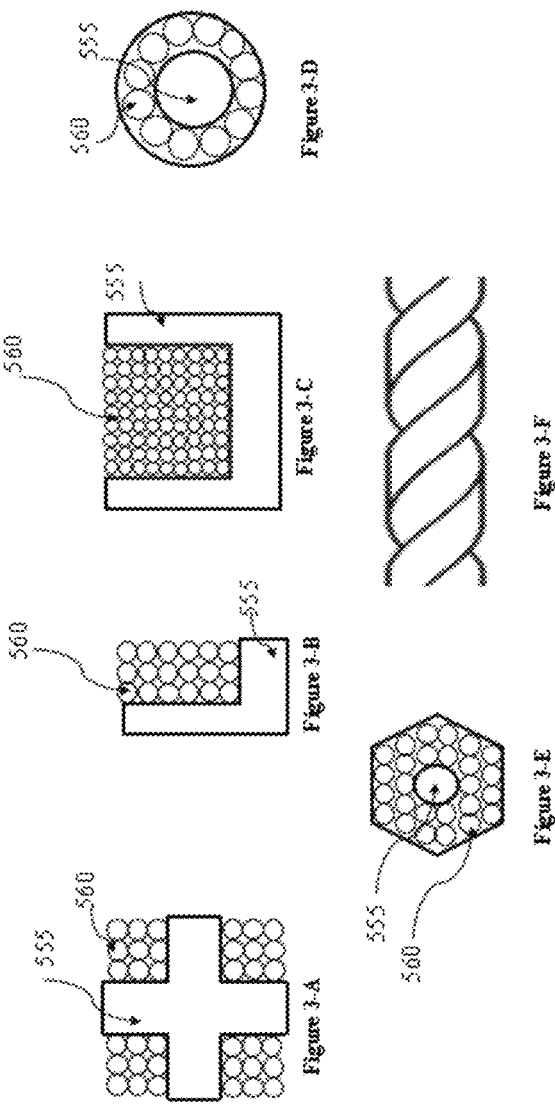

TIRE COMPRISING A PAIR OF FLEXIBLE BEAD CORES

FIELD OF THE INVENTION

The present invention relates to a tyre for a motor vehicle, comprising a pair of flexible bead wires of reduced mass. The invention applies to any type of tyre for any type of vehicle.

Definitions

By convention, consideration is given to a frame of reference (O, OX, OY, OZ), the centre O of which coincides with the centre of the tyre, the circumferential direction OX, axial direction OY and radial direction OZ refer to a direction tangential to the tread surface of the tyre in the direction of rotation, to a direction parallel to the axis of rotation of the tyre, and to a direction orthogonal to the axis of rotation of the tyre, respectively.

Radially inner and radially outer mean closer to and further away from the axis of rotation of the tyre, respectively.

Axially inner and axially outer mean closer to and further away from the equatorial plane of the tyre, respectively, the equatorial plane of the tyre being the plane that passes through the middle of the tread of the tyre and is perpendicular to the axis of rotation of the tyre.

The make-up of the tyre is usually described by a representation of its constituent components in a meridian plane, that is, a plane containing the axis of rotation of the tyre. Reference will be made to a meridian section, which corresponds to a section through the tyre in a meridian plane.

A tyre comprises a crown intended to come into contact with the ground via a tread, the two axial ends of which are connected via two sidewalls to two beads that provide the mechanical connection between the tyre and the rim on which it is intended to be mounted.

A radial tyre also comprises a reinforcement made up of a crown reinforcement radially on the inside of the tread and a carcass reinforcement radially on the inside of the crown reinforcement.

The crown reinforcement of a radial tyre comprises a superposition of circumferentially extending crown layers radially on the outside of the carcass reinforcement. Each crown layer consists of reinforcers that are parallel to one another and coated in a polymer material of the elastomer or elastomer compound type. The assembly consisting of the crown reinforcement and the tread is referred to as the crown.

The carcass reinforcement of a radial tyre usually comprises at least one carcass layer consisting of metal or textile reinforcing elements coated in an elastomer coating compound. The reinforcing elements are substantially parallel to one another and form an angle of between 85° and 95° with the circumferential direction. The carcass layer comprises a main part which joins the two beads together and is wrapped, in each bead, around an annular reinforcing structure.

The annular reinforcing structure in question here is a bead wire, which in the current prior art comprises a circumferential reinforcing element wrapped in at least one, non-limitingly metallic, elastomer or textile material. The carcass layer is wrapped around the bead wire from the inside towards the outside of the tyre to form a turn-up comprising an end. The turn-up, in each bead, allows the carcass reinforcement layer to be anchored to the bead wire.

The bead wire embedded in the bead contributes to many functions of the tyre.

First of all, the bead wire contributes to airtightness, notably for tubeless tyres, by preventing internal inflation gas from leaking out. The bead wire braces a layer of elastomer material against the rim, with clamping that increases with the inflation pressure. This airtightness is realized substantially axially on a seat part, and substantially radially on another, flange part of the rim. A clamping pressure on the rim seat of approximately 1.4 MPa and 2.5 MPa on the rim flange is expected.

Moreover, the clamping on the seat and on the rim flange should be sufficient to avoid the tyre becoming unseated in the event of tight cornering.

Furthermore, the quality of the clamping of the tyre on the rim is also involved in the transmission of engine and/or braking torques of the vehicle. A high degree of clamping of the bead on the rim is expected to avoid the beads rotating on the rim, and to effectively transmit the engine/braking torques.

Lastly, the bead wire contributes to the handling of the vehicle. Changes in direction are initiated by a steering angle of the steering wheel, which is transmitted to the wheels of the steering axle, and then to the tyres of this same axle by virtue of the connection between the beads and the rim.

All the power of the vehicle is transmitted to the wheels of the driven axle and then to the tyres on this same axle by the connection between the beads and the rim and lastly to the four contact patches resulting from the load of the vehicle causing the tyres to be compressed against a ground on which they are running. The quality of handling of the vehicle is thus determined by these two contact areas, specifically the contact between the tyres and the rim and the contact between the tyres and the ground on which they are running.

Most often in this present patent application, the tyre is shown mounted on a rim. Said rim is selected in accordance with the specifications of the ETRTO (European Tyre and Rim Technical Organisation) standard, which associates recommended rims with a given tyre size.

In general, multiple rim widths can be suitable for one and the same tyre size. The part of the rim that interacts with the tyre within the scope of the invention is axisymmetric relative to the axis of rotation of the tyre. To describe the rim, it is sufficient to describe the generator profile in a meridian plane.

In a meridian plane, the rim comprises at least one flange located at one axial end and connected to a seat that is intended to receive the radially innermost face of the bead. A rectilinear portion that connects the rim flange to the seat via fillets is located between the seat and the flange. The flange of the rim extended by the rectilinear portion axially limits the movement of the beads during inflation.

The mountability of the beads on a rim during inflation is also a performance on which the invention can have an impact. The performance in terms of mountability of the beads consists in evaluating the ability of the beads of a tyre to be installed correctly on a rim during inflation. Means, in particular radiographic means, for observing the beads mounted on a rim make it possible to diagnose the quality of the mounting.

It is therefore possible to rank two tyres with respect to their mountability performance on a rim.

PRIOR ART

Most often, in the prior art, a bead wire is made of metal with a steel core surrounded by metal cords. The core is made of a steel monofilament which is bent round on itself and its two ends are welded in order to form an approximately circular ring. It follows that the mass of the two metallic bead wires significantly contributes to the total mass of the tyre.

Materials other than steel have already been used to form bead wires. Bead wires comprising textile, most often, aramid, nylon or polyester cords can be found in the prior art. These textile cords can be used individually or in combination with other reinforcing materials.

Textile has been used as a tyre reinforcer since the very beginning. Textile cords, manufactured from continuous textile fibres, such as polyester, polyamide (nylon and/or aramid) or cellulose fibres, play an important part in tyres, including high-performance tyres approved for very high speed running. To meet the requirements of the tyres, they need to exhibit a high breaking strength, a high tensile modulus, good fatigue endurance and lastly good adhesion to the matrices of rubber or other polymers that they may reinforce.

It will be briefly noted here that these textile plied yarns or cords, conventionally having a double twist (T1, T2), are prepared by what is known as a "twisting" method in which:

during a first step, the overtwisting, each constituent spun yarn or multifilament fibre (or just "yarn") of the final cord is first of all twisted individually on itself (with an initial twist Ti) in a given direction D1 (respectively in the S or Z direction) in order to form a strand in which the elementary filaments find themselves deformed into a helix around the axis of the fibre (or axis of the strand);

and then, in a second step, the twisting, multiple strands, usually two, three or four in number, of identical kinds or different kinds in the case of cords known as hybrid or composite, are subsequently twisted together with a final twist T2 (which may be equal to or different from Ti) in an opposite direction D2 (the direction Z or S respectively, according to a recognized terminology designating the orientation of the turns according to the central portion of an S or a Z), to produce the cord or final assembly having multiple strands.

The purpose of the twisting is to adapt the properties of the material so as to create the transverse cohesion of the reinforcer, increase its fatigue resistance and also improve adhesion with the reinforced matrix.

Such textile cords, their constructions and methods of manufacture are well known to those skilled in the art. They have been described in detail in many documents, of which the following are only a few examples: EP021 485, EP220 642, EP225 391, EP335 588, EP467 585, U.S. Pat. Nos. 3,419,060, 3,977,172, 4,155,394 and US5 558.

Document DE19706262A1 discloses a tyre with bead wires formed of textile cords, and more specifically aramid cords, wound in the radial and axial directions. This document explains the improvement in the burst pressure obtained with this type of bead wire, but does not give details as to the other functions to which the bead wires contribute.

Document FR2741566B3 also proposes a bead wire for vehicle tyres having multiple layers of synthetic fibres, preferably aramid fibres, which are wound with juxtaposition or superposition, the layers or fibres being coated with a bonding agent by means of which the layers and/or fibres are fixed to one another. The targeted object is dimensional stability of the bead wire so that it can be used in the subsequent steps for manufacturing the tyre without losing its predefined shape. The difficulties of implementing this solution make the costs prohibitive.

There is still a need to optimize the design of bead wires for tyres without adversely affecting the many functions to which they contribute.

The inventors have set themselves the objective of designing a tyre provided with a pair of bead wires that have reduced mass while still performing the many expected functions of bead wires. The inventors were also interested in designing bead wires for which the industrial manufacturing cost is kept under control in relation to the prior art.

SUMMARY OF THE INVENTION

This aim has been achieved by a tyre for a motor vehicle, comprising the following in a meridian plane:

two beads intended to be mounted on a rim, two sidewall layers connected to the beads, and a crown having a tread, the crown having a first side connected to the radially outer end of one of the two sidewall layers and a second side connected to the radially outer end of the other one of the two sidewall layers;

at least one carcass reinforcement extending from the two beads as far as the crown, the carcass reinforcement having a plurality of carcass reinforcing elements and being anchored in the two beads by way of a turn-up around a bead wire, so as to form a main part and a turn-up in each bead;

in each bead, the bead wire having the form of a closed circumferential ring, bracing the bead of the tyre against the rim and comprising a first part made of a first material M1 taking the form of textile cords, said first part interacting with a second part of the bead wire made of a reinforcing second material M2;

the tensile stiffness of the bead wire is comprised between $4.5 \times 10^5$ N/m and $1.8 \times 10^6$ N/m;

the circumferential bending stiffness of the bead wire, Kf, is greater than or equal to $Kr*(1000$ mm per $m*D/(16$ in.$*25.4$ mm per in.$))^3$, where D is the diameter of the wheel on which the tyre is mounted, measured at the seat of the rim in meters, and where Kr is equal to $2 \times 10^{-2}$ N$*m^2$;

the elastic elongation of the bead wire is greater than or equal to 2%.

The stiffness is the mechanical variable which indicates the resistance of a body (for example a spring) to elastic deformation. The stiffer a component is, the more force must be applied to it to obtain a given deflection. Tensile stiffness of a bead wire refers to the ratio of a force applied in the circumferential direction divided by the displacement obtained.

In this case, the circumferential bending stiffness of the bead wire is defined as the product of the elastic modulus (Young's modulus) and the area moment of inertia of a meridian section through the bead wire in the circumferential direction. In the International System of Units, the circumferential bending stiffness is expressed in Newtons per square meter. This variable can be measured, for example, according to the ISO 178 standard.

The principle of the invention is to break down a bead wire into coherent functional units in relation to the stresses to which it is subjected.

A bead wire undergoes both circumferential bending and tensile stresses. This is because, during the phase of mounting the tyre on a rim, the bead wire must be flexible enough to elongate without breaking in order to traverse the rim flange. Furthermore, while the tyre is being inflated, the bead wire must develop pronounced circumferential forces in order to brace the bead against the rim to a sufficient extent. A clamping pressure of around 14 bar is expected on the seat of the rim for a passenger vehicle tyre.

According to the inventors, the mounting of the tyre on the rim on which it is used frequently causes considerable bending in the bottom part. This bending is generated when the bead wire must traverse the rim flange, since if it does not develop far enough, it is necessary to apply a local force to it (using a lever or a roller). At this location, a significant curvature is often noted; the material that is stiff in compression must have a modulus above a certain threshold so that the bead wire can be mounted without breaking.

This functional approach leads to a solution for a bead wire which comprises textile cords supplying the necessary tensile stiffness, and said textile cords interact with a second material provided with a high compression elastic modulus. This second material contributes to conferring a suitable level of circumferential bending stiffness on the bead wire by virtue of its compression elastic modulus. A high compression elastic modulus is understood to mean a value comprised between 1 GPa and 10 GPa.

That the textile cords interact with the second material M2 means that said material M2 can, for example, sheath the textile cords by being wound around them. Another example corresponds to the case in which the second material makes up a core of the bead wire, and the textile cords are wound around this core in the circumferential direction.

To quantify the circumferential bending stiffness necessary for correct functioning of the bead wire, the inventors have analysed the various steps for manufacturing the green tyre before the curing phase in a mould provided for this.

During manufacture, the bead wire is handled multiple times while the green tyre is being produced before the curing phase. It is therefore necessary to keep it in its toroidal shape without collapsing under its own weight, or under the weight of the carcass. A suitable level of circumferential bending stiffness makes it possible to maintain the initial shape of the textile bead wire. The inventors have identified the bending stiffness Kr necessary for the bead wire to avoid it collapsing under its weight or under that of the carcass for a tyre with a rim diameter of 16 inches. This bending stiffness takes the value Kr which is equal to $2\times10^{-2}$ N*m².

The inventors have investigated the manufacturing parameters to establish the relationship between the circumferential bending stiffness of the bead wire of the tyre under investigation in comparison with a metallic bead wire of the prior art.

According to the inventors, the circumferential bending stiffness of the bead wire should be greater than Kr*(1000 mm per m*D/(16 in.*25.4 mm per in.))³, where D is the diameter of the wheel on which the tyre is mounted, measured at the seat of the rim in meters. The bending stiffness is thus parametrized by the size of the tyre under investigation. This condition constitutes the second main feature of the invention.

The first main feature of the invention, relating to the stiffness of the bead wire in the circumferential direction, is linked to the choice of the material M1.

The choice of the material M1 focuses on the textile cords selected from the class of aramid, and/or nylon, and/or polyester. By way of illustration, an aramid cord composed of two strands of 167 tex, twisted with a twist of 315 turns per meter, is suitable for the invention. The breaking force of such a cord is 60 daN, with an elongation at break of 5%. Its tensile elastic modulus is greater than 30 GPa.

The choice of textile cords results in a bead wire having a tensile stiffness comprised between $4.5\times10^5$ N/m and $1.8\times10^6$ N/m, for the range of tyres under consideration here.

The third main feature of the invention is linked to the ability of the bead wire to extend without breaking under tensile stress.

This is because the radial diameter of the point located at the radial end of the bead of a tyre of the invention is less than the diameter of the rim measured at the seat. A geometric clamping of the bead wire on the rubber layer located between the bead wire and the rim is based on this difference in diameter. This clamping is useful to hold the tyre in position on the rim when there is a drop in the inflation pressure, so as to avoid the tyre coming off of the rim. The bead wire of the invention, by virtue of its high elastic extension greater than or equal to 2%, can absorb this stress without breaking.

The main features of the invention, specifically the tensile stiffness of the textile bead wire comprised between $4.5\times10^5$ N/m and $1.8\times10^6$ N/m, its bending stiffness greater than Kr*(1000 mm per m*D/(16 in.*25.4 mm per in.))³, and its elastic elongation greater than or equal to 2%, in combination lead to the tyre of the invention, that is to say a tyre which has reduced mass in relation to the prior art and is capable of performing all the expected functions of the bead wire. Further secondary features linked to the choice of the materials M1 and M2, or different embodiments, are presented below.

Advantageously, the tensile elastic modulus of the first material M1 is comprised between 10 GPa and 120 GPa.

A tensile elastic modulus of less than 10 GPa would require an excessively large meridian section of the bead wire, creating difficulties in respect of the mass and the overthicknesses. A tensile elastic modulus of above 120 GPa, by contrast, would lead to an excessively narrow cross section that would result in stresses capable of breaking the bead wire.

With preference, the compression elastic modulus of the second material M2 is comprised between 1 and 10 GPa.

According to the inventors, to reach the target bending stiffness value, Kr*(1000 mm per m*D/(16 in.*25.4 mm per in.))³, the compression elastic modulus must be between 1 GPa and 10 GPa.

According to one embodiment of the invention, the second part of the bead wire made of the material M2 is wound around the first material M1 of the first part of the bead wire, so as to form a sheathing of the first material M1, and the bead wire is obtained by a stack of layers of the cord thus sheathed.

According to this embodiment, the bead wire is obtained by repeating a base element made up of a textile cord coated with an elastomer second material, which gives the assembly its bending stiffness. This base element is thus a sheathed textile cord. The coating material may be chosen from the class of polyamides, such as nylon. This elastomer has a compression elastic modulus of less than 10 GPa.

A transverse winding method is used to manufacture the bead wire from the sheathed cord. The bead wire is obtained by winding a turn around a support with lateral movement by a distance equal to the diameter of the sheathed cord. At the end of the process, the bead wire results from the assembly of multiple layers of sheathed cords which are bonded to one another, giving the bead wire its stiffness. The cross section of the assembly in a meridian plane may, for example, take the shape of a hexagon, or any other polygonal, or circular, shape.

A variant of this embodiment is encountered when the cords are replaced by filaments of a textile that are embedded in the coating mixture.

According to another embodiment of the invention, the second part of the bead wire made of the material M2 is an internal core, and the first part of the bead wire is made of the material M1, in the form of textile cords, and wound around said internal core.

The core may be made of a polylactic acid (PLA) polymer. PLA has a Young's modulus comprised between 3 and 3.5 GPa, a tensile strength comprised between 50 and 70 MPa, an elongation at break which varies from 2 to 10%, and a bending modulus of 4 to 5 GPa.

One of the advantages of PLA is that it is a natural, bio-based alternative to the conventional materials derived from petroleum.

This is because PLA can be obtained from maize starch. It is a product resulting from the fermentation of sugars or starch under the effect of bacteria, synthesizing the lactic acid. In a second step, the lactic acid is polymerized by a fermentation process to become polylactic acid.

Another possible choice for the second material M2 is polyamide (nylon) 66. It is composed of two monomers which each contain 6 carbon atoms, hexamethylenediamine and adipic acid, which give it its name of nylon 66. Nylon 66 is used when high mechanical strength, stiffness, good heat stability and/or chemical resistance are required, as is the case here. Its elastic modulus is 3.5 GPa and its compression modulus is 2.7 GPa. Its elongation at break is 70%.

Advantageously, the geometry of the core in a meridian section of the bead wire is in the shape of a cross having 3 to 6 arms, or has an "L" shape, or a "U" shape, or an "H" shape, or is circular, or polygonal with at least 3 sides.

The "L" and "U" shapes of the meridian section of the bead wire make it possible to contain the textile cords that provide the circumferential tensile stiffness.

In the case of a core with a cross-shaped or "H"-shaped cross section, the space between each arm determines a volume which will be filled by the textile threads. To avoid having to pass above each arm, it is necessary for the bonding to be done with a rotation of 1/Nb turns over the facing sections, with Nb being the number of arms of the cross. In this way, during the winding, one and the same thread will naturally fill all the spaces between the arms of the cross without needing to interrupt the process.

Advantageously, the second material M2 of the core of the bead wire is of the thermoset type, preferably crosslinked and more particularly of the vinyl ester type.

With preference, the textile cord is obtained by twisting a twist T2 of N strands of a textile material in a given direction D1 (respectively in the S or Z direction), with N≥1, each strand resulting from overtwisting a twist T1 of a spun yarn of said textile material in an opposite direction D2 (Z or S, respectively).

Advantageously, the spun yarns are made of a hybrid assembly of filaments of textile materials such as (nylon, PET, aramid).

With preference, the spun yarns are made of an assembly of aramid filaments; also with preference, the number N of strands for the twisting is comprised between 2 and 6, and with even more preference N=2.

Preferentially the overtwisting twist T1 and the twisting twist T2 are identical, and less than 500 turns per meter, preferentially T1 and T2 are identical and less than 440 turns per meter, and more preferentially still T1 and T2 are identical and less than or equal to 315 turns per meter.

Advantageously, the external layer around the core of the bead wire is made up of 15 to 70 aramid cords.

Advantageously, with the bead of the tyre comprising a sidewall layer and a protective layer, said sidewall and protective layers are made of the same elastomer material.

Also advantageously, the filler layer is made of a composite material comprising textile filaments associated with an elastomer matrix.

BRIEF DESCRIPTION OF THE DRAWINGS

Further details and advantageous features of the invention will become apparent in the following text from the description of the exemplary embodiments of the invention, with reference to the figures, which represent schematic views of a tyre, and bead wires according to the embodiments of the invention. In order to make them easier to understand, the figures are not shown to scale.

FIG. 1 comprises a view 1-A which shows a cross section through a tyre of the invention in a meridian plane, and a view 1-B which represents an enlarged view of a portion of the meridian view 1-A surrounded by a dashed circle showing an enlarged view of the area of the bead containing a bead wire of a tyre of the invention.

FIG. 2-A is a metallic bead wire of the prior art. FIGS. 2-B, 2-C and 2-D show embodiments of the invention with cross-sectional views through the bead wire in a meridian plane. In these embodiments, an annular base element is made of the first material of the first part of the bead wire, that is to say a textile cord which occupies the interior space. The second material occupies the peripheral space, so as to form a sheath around the textile-cord material.

FIGS. 3-A, 3-B, and 3-C represent embodiments of the invention in which the bead wire has a core of variable geometry in a meridian section and which show textile cords associated with a stiff homogeneous material of variable geometric shape making up a core around which the textile cords are wound. FIG. 3-D represents an embodiment of the invention in which the bead wire has a core of variable geometry in a meridian section. FIG. 3-E represents an embodiment of the invention in which a cross section of the bead wire is hexagonal. FIG. 3-F represents an embodiment of the invention showing textile cords associated with a stiff homogeneous material of variable geometric shape making up a core around which the textile cords are wound.

DETAILED DESCRIPTION OF THE INVENTION

The invention was implemented on a passenger vehicle tyre of size 245/45R18 in accordance with the specifications of the ETRTO (European Tyre and Rim Technical Organisation) standard. Such a tyre can carry a load of 800 kilos, inflated to a pressure of 250 kPa.

In FIG. 1-A, the tyre of overall reference 1 comprises a carcass reinforcement 90 consisting of reinforcers coated in a rubber composition, and two beads 50 in contact with a rim 100. A region 49 delimited by a dashed circle defines a lower region of the tyre, an enlarged view of which is given in FIG. 1-B. The carcass reinforcement 90 is anchored in each of the beads 50. The tyre further comprises a crown reinforcement 20 comprising two working layers 21, 22 and a hooping layer 23. Each of the working layers 21 and 22 is reinforced by filamentary reinforcing elements which are parallel within each layer and crossed from one layer to the next, forming angles of between 10° and 70° with the circumferential direction. The hooping layer 23 is positioned radially outside the crown reinforcement 20, this hooping layer 23 being formed of reinforcing elements oriented circumferentially and wound in a spiral. A tread 10 is placed radially on the outside of the hooping layer 23; it is this tread 10 which provides the contact between the tyre 1 and the ground. The tyre 1 depicted is a "tubeless" tyre: it comprises an "inner liner" 95 made from a rubber composition impermeable to the inflation gas, covering the inner surface of the tyre.

The part of the rim 100 that interacts with the tyre within the scope of the invention is axisymmetric relative to the axis of rotation of the tyre.

In a meridian plane, the rim 100 comprises at least one flange 120 located at one axial end and connected to a seat 110 that is intended to receive the radially innermost face of the bead. A rectilinear portion 130 that connects the rim flange 120 to the seat 110 via fillets is located between the seat 110 and the flange 120. The flange 120 of the rim extended by the rectilinear portion 130 axially limits the movement of the beads during inflation.

FIG. 1-B shows a lower region of overall reference 55 containing the sidewall layer 30 and the bead 50. The contour of the lower region follows the outer contours of at least part of the sidewall layer 30 and the outer contour of the bead 50.

Said bead 50 partially comprises a carcass reinforcement 90 that comprises a main part 52, and is then wrapped around a bead wire 51 to form a turn-up 53. A filler layer 70 is positioned between the main part 52 of the carcass reinforcement 90 and its turn-up 53. Depending on the embodiment, the bead 50 can comprise a lateral reinforcing layer 60, positioned axially outside the turn-up 53 and axially inside the sidewall layer 30. Axially innermost from the bead 50, an airtight layer 95 forms the inner wall in contact with the internal inflation air.

Said bead 50 also comprises a protective layer 80 that is in axially outer contact with a rectilinear portion 130 of the rim so as to limit the axial movement of the bead. Said protective layer 80 also comprises a portion intended to be in contact with the rim on the rim seat 110. A sidewall layer 30 interacts with the bead 50 and forms an outer lateral wall.

FIG. 2-A represents a meridian section of a bead wire 51 of the prior art, made up of a steel central core 520 surrounded by metallic cords 510.

FIG. 2-B represents a bead wire of the invention of hexagonal cross section. The textile cords 560 are surrounded by a sheath made of the second material 550. A transverse winding method is used to manufacture the bead wire from the sheathed cord. The bead wire is obtained by winding a turn around a support with lateral movement by a distance equal to the diameter of the sheathed cord. At the end of the process, the bead wire results from the assembly of multiple layers of sheathed cords which are bonded to one another, giving the bead wire a certain stiffness.

FIG. 2-C shows an enlarged view of the sheathed cord. The sheath 550 surrounds the cord 560.

FIG. 2-D shows a bead wire of the invention in which the first material M1 in the form of textile spun yarns is dispersed in a matrix made of the second material M2. The matrix may be made of a polylactic polymer (PLA), or a nylon (polyamide 6-6: PL66), or vinyl ester. PA66 has a compression modulus of 2.7 GPa and an elongation at break of 70%.

FIGS. 3-A, 3-B, 3-C and 3-D are embodiments in which the bead wire has a core of variable geometry in a meridian section. The core made of the material M2 is referenced 555, and the textile cords are referenced 560. FIG. 3-F is a view in the circumferential direction showing the winding of the textile cords around an internal core.

Configurations of tyres of the invention were tested in order to clearly highlight the performance offered by the invention. The results of these tests were compared with those obtained on control tyres.

The results for the tyre of the invention were compared with those of a control having the same size and provided with a braided metallic bead wire.

The bead wire of the control T comprises a mild steel core with 0.1% carbon, and a layer of metallic cords twisted around said core. The threads of the cords are made of steel with 0.7% carbon. The core has a diameter of 215 hundredths of a millimeter and each metallic cord around the core has a diameter of 130 hundredths of a millimeter. The total diameter of the bead wire (core+ layers of cords included) is 4.79 mm. The mass of such a bead wire is 169 g. It is illustrated in FIG. 2-A.

The first tyre P1 in accordance with the invention reprises the specifications of the control T, but the bead wire is composed of sheathed textile cords. The cord is obtained after twisting two strands each having a linear density of 167 tex. Each strand is the result of overtwisting a spun yarn with 315 turns per meter. The twist during the twisting phase is also 315 turns per meter.

The sheath of the cord is made of polyamide 6-6, and the geometry of the bead wire is hexagonal as depicted in FIG. 2-B. The cross section of the sheathed cord is 0.55 mm², and the total cross section of the bead wire is 24 mm². The bead wire is obtained after a transverse winding operation of 45 turns. The mass of this bead wire is 35 grammes.

Lastly, the second tyre P2 in accordance with the invention contains a pair of bead wires each made up of multiple layers of textile cords made of aramid that are wound around an internal core made of a PLA polymer. The cords are identical to those used for P1, and the internal core of the bead wire made of PLA has a diameter of 5.5 mm.

The cross section of the central core is 24 mm², and the total cross section of the bead wire is 41 mm². In a meridian plane, a cross section of the bead wire is hexagonal, as depicted in FIG. 3-E. The core is extruded by a known method and then cut, curved and bonded to itself to form a ring. The mass of the bead wire is 60 grammes.

The following table summarizes the various configurations tested:

TABLE 1

| Bead wires | Control T (FIG. 2-A) | P1 (FIG. 2-B) | P2 (FIG. 3-E) |
|---|---|---|---|
| Solution | Metallic core 215 + 8x130 | Sheathed cord | Internal core + cords Core diameter: 5.5 mm |
| Breaking strength | 16.5 kN, minimum 26 kN, maximum | 22 kN | 22 kN |
| Interior | 1466 mm | 1450 mm | 1450 mm |

TABLE 1-continued

| Bead wires | Control T (FIG. 2-A) | P1 (FIG. 2-B) | P2 (FIG. 3-E) |
|---|---|---|---|
| development | | | |
| Diameter | 4.79 mm | 5.5 mm | 7.2 mm |
| Mass of bead wire | 169 g | 35 g | 60 g |
| Tensile stiffness (Young's modulus x S) | 2990 kN | 700 kN | 700 kN |
| Bending stiffness (N · mm²) | $5.10^5$ | $10^5$ | $2.10^5$ |
| Cross-sectional area of bead wire | 18.1 mm² | 24 mm² | 41 mm² |

The control tyre and those of the invention were tested and compared for performance criteria affected by the influence of the bead wires.

As seen above, the bead wires contribute to the handling performance of the vehicle. The influence of the bead wires on the handling can be assessed by analysing the transverse cornering stiffnesses.

The transverse cornering stiffness was measured on dedicated measuring machines, such as those sold by MTS.

The bead wire also contributes to the quality of the mounting of the bead on a rim. The test of mountability on a rim consists in giving a result for the overall mountability on the basis of a breakdown of the mounting into elementary operations, which notably comprise: passing through the rim flanges, pressure tapping, crossing of humps on the rim, placing the bead by compression, the tightness below the rim seat, debeading and dismounting. To perform this test, means are necessary such as a semi-automatic mounting machine, or else means A result greater than (respectively less than) 100% indicates an improvement (respectively a diminution) in the performance criterion under consideration.

The results obtained are summarized in Table 2 below:

TABLE 2

| | Burst pressure | Mass of tyre | Mass of bead wire | Unseating pressure | Mountability on rim |
|---|---|---|---|---|---|
| T1 | 100 | 100 | 100 | 100 | 100 |
| P1 | 90 | 105 | 500 | 100 | 99 |
| P2 | 90 | 103 | 300 | 100 | 98 |

The tyres of the invention have a burst pressure comparable with that of the control. The flexibility of the bead wires of the invention does not affect their burst strength much. The mass of the bead wires of the invention is significantly less than that of the control T.

Moreover, the performance of a metallic bead wire is reprised, which would not be the case for the textile bead wires of the prior art.

The inventors have designed a tyre provided with a pair of bead wires that have reduced mass while still performing the many expected functions of bead wires. The inventors have also proposed bead wires for which the industrial manufacturing cost is kept under control in relation to the prior art.

The invention claimed is:

1. A tire for a motor vehicle, comprising the following in a meridian plane:

two beads intended to be mounted on a rim;

two sidewall layers connected to the beads;

a crown having a tread, the crown having a first side connected to a radially outer end of one of the two sidewall layers and a second side connected to a radially outer end of an other one of the two sidewall layers;

at least one carcass reinforcement extending from the two beads as far as the crown, the at least one carcass reinforcement having a plurality of carcass reinforcing elements and being anchored in the two beads by way of a turn-up around a bead wire, so as to form a main part and a turn-up in each bead, wherein, in each bead, the bead wire has a form of a closed circumferential ring, bracing the bead of the tire against the rim and comprising a first part made up of a first material M1 taking a form of textile cords, the first part interacting with a second part of the bead wire made up of a reinforcing second material M2, wherein a tensile stiffness of the bead wire is comprised between $4.5 \times 10^5$ N/m and $1.8 \times 10^6$ N/m, wherein a circumferential bending stiffness of the bead wire, Kf, is greater than or equal to Kr*(1000 mm per m*D/(16 in.*25.4 mm per in.))³, where D is a diameter of a wheel on which the tire is mounted, measured at a seat of the rim in meters, and where Kr is equal to $2 \times 10^{-2}$ N*m², and wherein an elastic elongation of the bead wire is greater than or equal to 2%.

2. The tire according to claim 1, wherein a tensile elastic modulus of the first material M1 is comprised between 10 GPa and 120 GPa.

3. The tire according to claim 1, wherein the bead comprises at least one sidewall layer and one protective layer, and wherein the sidewall and protective layers of the bead are made up of the same elastomer material.

4. The tire according to claim 1, wherein a filler layer is made up of a composite material comprising textile filaments associated with an elastomer matrix.

5. The tire according to claim 1, wherein a compression elastic modulus of the second material M2 is comprised between 1 GPa and 10 GPa.

6. The tire according to claim 5, wherein the second part of the bead wire made up of the material M2 is wound around the first material M1 of the first part of the bead wire, so as to form a sheathing of the first material M1, and wherein the bead wire is obtained by a stack of layers of the cord thus sheathed.

7. The tire according to claim 1, wherein the second part of the bead wire made up of the material M2 is an internal core, and wherein the first part of the bead wire made up of the material M1, in the form of textile cords, is wound around the internal core.

8. The tire according to claim 7, wherein a geometry of an internal core in a meridian section of the bead wire is in a shape of a cross having 3 to 6 arms.

9. The tire according to claim 7, wherein a geometry of the internal core in a meridian section of the bead wire has an L shape, or a U shape or an H shape, or is circular, or polygonal with at least 3 sides.

10. The tire according to claim 7, wherein the second material M2 making up the internal core of the bead wire is of the thermoset type.

11. The tire according to claim 1, wherein the textile cord is obtained by twisting a twist T2 of N strands of a textile material in a given direction D1, with N≥1, each strand resulting from overtwisting a twist T1 of a spun yarn of the textile material in an opposite direction D2.

12. The tire according to claim 11, wherein the spun yarns are made up of a hybrid assembly of filaments of textile materials.

13. The tire according to claim 12, wherein the spun yarns are made up of an assembly of aramid filaments.

14. The tire according to claim 13, wherein the number N of strands for the twisting is comprised between 2 and 6.

15. The tire according to claim 14, wherein the overtwisting twist T1 and the twisting twist T2 are identical, and less than 500 turns per meter.

16. The tire according to claim 15, wherein an external layer around an internal core of the bead wire is made up of 15 to 70 aramid cords.

*    *    *    *    *